May 4, 1943. H. D. BELOCK 2,318,450
TIMING SYSTEM
Filed June 9, 1938 2 Sheets-Sheet 2
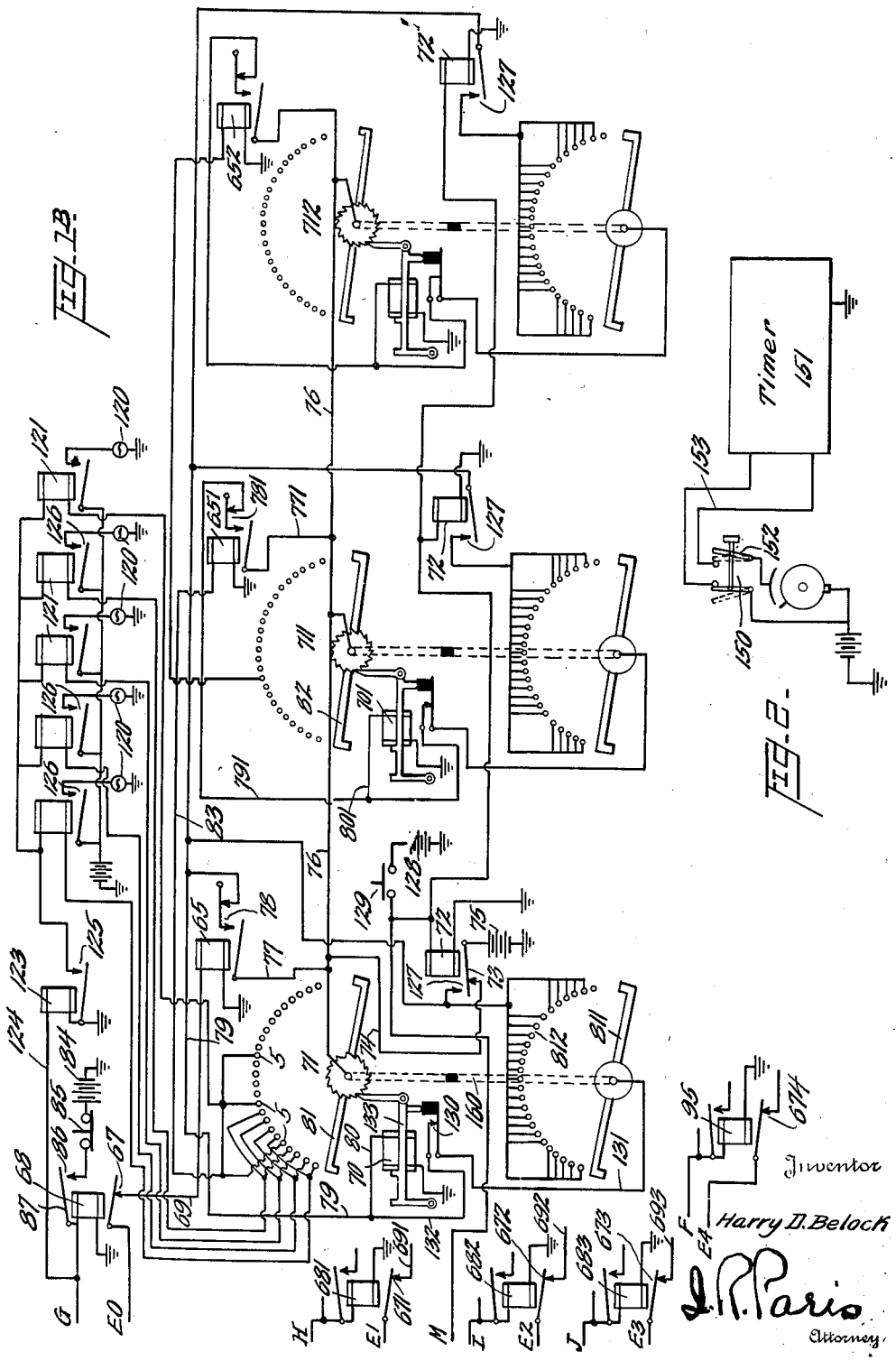

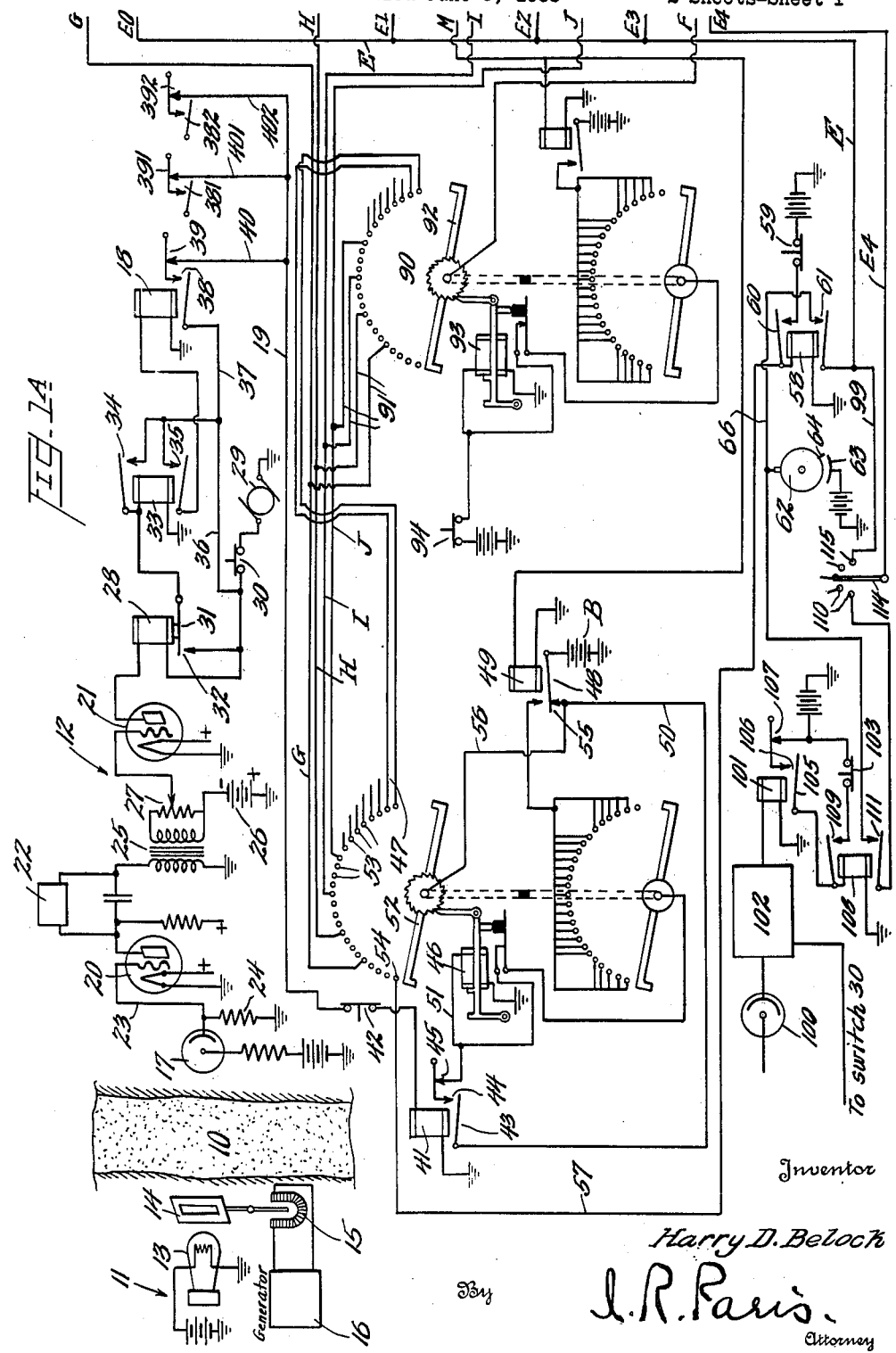

Patented May 4, 1943

2,318,450

UNITED STATES PATENT OFFICE 2,318,450

TIMING SYSTEM

Harry D. Belock, Richmond Hill, N. Y., assignor to American Teletimer Corp., New York, N. Y., a corporation of New York Application June 9, 1938, Serial No. 212,858

11 Claims. (Cl. 161—18)

The present invention relates to an electrical timing system for the purpose of indicating or recording the speed or rate of travel of moving objects over a given course.

More particularly, the present invention relates to a system for indicating or recording the best time made by the leader in any race or in a portion of the race, where the race is conducted over an ordinary race course or race track.

While the invention as disclosed herein is particularly applicable for timing horse races, automobile races, bicycle races, foot races, or other races which are customarily conducted on a track or course which is built and designed for that particular purpose, it will be obvious to persons skilled in the art that it is applicable to other races, and that many phases of the invention are applicable for other purposes.

Other objects, novel features, and advantages of this invention will be apparent from the following specification and the accompanying drawings which illustrate one embodiment of the present invention.

In the drawings:

Figures 1A and 1B together illustrate the system.

Figure 2 illustrates one timer employed in the manner of a stop watch.

In the present invention the race trace 10 is provided with wayside signaling devices which are disposed at predetermined intervals along the track and preferably every sixteenth of a mile. Such signaling devices may be of any suitable type desired, and in the embodiment of the invention shown herein, the signaling device comprises the parts 11 and 12 which are disposed on opposite sides of the track facing each other. The device 11 comprises primarily a steady source of light 13 and a vibrating shutter 14, disposed in front of the light and operated by the motor or electromagnet 15 fed by the 600 cycle generator 16. The vibrator thus operates at 600 cycles with the result that the photoelectric cell 17 receives modulated light at the rate of 600 cycles per second.

The remaining devices which constitute a part of the wayside apparatus 12 may be of any suitable construction and arrangement, the object of such apparatus being to provide means whereby the relay 18 will transmit an electric impulse of short duration, whenever an opaque object is interposed between the light 13 and the photoelectric cell 17 and the transmission of modulated light from the light to the photoelectric cell is interrupted. More specifically, the apparatus interposed between the photoelectric cell 17 and the signal transmitting relay 18 comprises a pair of three electrode amplifier tubes 20 and 21 together with the band pass filter 22, tuned to 600 cycles per second in the plate circuit of the tube 20. The grid of tube 20 is connected to the photoelectric cell 17 by wire 23, the latter being also connected to ground by the resistance 24. Interposed between the amplifier tubes 20 and 21 are also the transformer 25 and the necessary grid bias on tube 21, provided by the battery 26 and the resistance 27.

The relay 28 is disposed in the plate circuit of the tube 21 and is normally energized by the source of alternating current 29; the manually operable switch 30 being interposed herein for the purpose of providing control of these devices as will appear below.

The relay 28 being normally energized when the system is in operation and manual switch 30 is closed, the armature 31 is normally held in its attracted position and the contacts 32 are normally open. When, however, a body is interposed between the wayside apparatus 11 and 12, the relay 28 becomes deenergized. This is occasioned by the drop in the voltage on the grid of the tube 21 which is biased to cut off, the tube 21 being a class C amplifier and permitting no plate current unless the grid is excited. The deenergization of the relay 28 consequent upon the interposition of a body between the devices 11 and 12 closes contacts 32 thereby causing the energization of relay 33 which remains energized by reason of the self-locking circuit established by contacts 34. The energization of the relay 33 in its turn causes energization of the signal transmitting relay 18 by reason of the closing of contacts 35. The energization of the signal transmitting relay 18 in its turn causes the transmission of an impulse of short duration from the source of alternating current 29 through the closed switch 30, wires 36 and 37, and make before break contacts 38 and 39, and wire 40 to the track control wire 19.

By means of the apparatus 11 and 12 as described, the first barrier which is interposed between the wayside apparatus 11 and 12 will bring about the transmission of an impulse of short duration to the track wire 19 and the relays 33 and 18 will remain energized, thereby preventing the transmission of another signal by the same apparatus until the switch 30 is opened and closed. The opening of the switch deenergizes the relays 33 and 18 and the closing of the switch sets up the wayside apparatus 12 in condition.

The wayside apparatus 11 and 12 are disposed along the track at predetermined intervals and preferably every sixteenth of a mile. This is diagrammatically indicated by the make before break contacts 381 and 391 and wire 401 leading to the track wire 19, serving to indicate the wayside apparatus at the eighth mile mark, and make before break contacts 382 and 392 and wire 402 at the three-sixteenths mile mark, it being thought unnecessary to illustrate the remaining wayside apparatus, for the same are merely duplicates of the wayside apparatus, 11 and 12, disclosed in detail in the drawings and fully described immediately above. The current source 29 and the switch 30 are at the central station and are common to all wayside apparatus so that the same are all reset by a single switch and by a single wire.

Thus as the race starts the wayside apparatus at the starting line will transmit a signal of short duration to the track wire 19 and a similar signal will be transmitted to the track wire 19 every sixteenth of a mile during the duration of the race. The track wire 19 enters the central station containing a master rotary switch 47 and several duplicate timers to indicate the time for the quarter mile, half mile, threequarters of a mile and for one mile or for the finish of the race.

Each of the timers comprises several rotary switches arranged in cascade, the first being operable every fifth of a second, the second every second, the third every ten seconds, the fourth every minute, and so on.

In the present system, the first rotary switch of all timers is started at the beginning of the race; and the timers are stopped by the master rotary switch at the proper time so that they indicate the time of the quarter mile, the half mile, the threequarters, the mile and the finish of the race; this being effected by the energization of a stop relay associated with each timer.

In the drawings only the quarter mile timer is shown in detail, whereas the remaining timers are indicated merely by the stop relay.

The track wire 19 enters the central station and is there connected to the track control relay 41 through the manual switch 42. The track control relay 41 is energized for the duration of the impulse transmitted by the track wire 19 and the armature 43 is attracted and cooperates with the make before break contacts 44 and 45 to transmit an impulse of short duration from the positive side of the 48-volt source of current B to the operating electromagnet 46 of the master rotary switch 47 through the armature 48 of the reset magnet 49, wire 50, armature 43, contacts 44, 45, wire 51, through operating electromagnet 46 to ground.

The switch 47 is of a type commonly known in the arts and includes a rotatable arm 52, preferably of the bridge type, and cooperates with a semi-circular series of contacts 53, 25 or 50 in number.

The energization of the operating electromagnet 46 will move the arm 52 one step from its normal or zero position to position No. 1 so that it contacts the first contact 54. This operation or rather this movement of the arm 52 serves to set into operation the first rotary switch in each timer. The number of timers may vary as desired. It is preferred, however, to have quarter mile, half mile, three-quarter mile, mile, and finish timers.

In this position where the arm 52 is in contact with the contact 54 the following circuit is established through the starting relay 58: ground, battery B, armature 48, front contact 55, wire 56, arm 52, contact 54, wire 57, and starting relay 58 to ground. This establishes a self-locking circuit from ground, battery, switch 59, armature 60, and through relay 58 to ground. The energization of relay 58 closes the contacts 61, thereby establishing connection between the interrupter 62 and the impulse distributor wire E. The interrupter 62 is operated by a synchronous motor not shown so that the interrupter disc revolves at 300 R. P. M. with the result that contact is made between the fixed contact 63 and the movable contact 64 every fifth of a second, thereby transmitting an impulse to distributing wire E every fifth of a second. It will thus be seen that within less than a fifth of a second after arm 52 has been moved one step from its zero position an impulse is transmitted by the interrupter 62 to the distributing wire E which impulse is received by receiving relay 65 of the first rotary switch in each timer by the following circuit: ground, battery, contacts 63 and 64, interrupter disc 62, wire 66, contact 61, distributor wire E, EO, contact 67 on normally deenergized stop relay 68, wire 69, and receiving relay 65 to ground.

The corresponding receiving relays in each of the other timers are similarly energized by the same impulse carried by wires E1, E2, E3, E4, and through contacts 671, 672, 673, 674 of stop relays 681, 682, 683, and 95 and then through wires 691, 692, and 693, etc., to their respective receiving relays. All timers are thus started simultaneously. From this point it will be sufficient to describe the structure and operation of the quarter mile timer, for the remaining timers are duplicates of the quarter mile timer, the difference residing only in the connection of the stop relay 68, 681, 682, 683 and 95 to the master switch 47, whereby the timers are stopped at different portions of the race.

The source of current 75 is normally connected to bus wire 76 through the armature of normally deenergized reset relay 72, contact 73, and wire 74. The energization of the receiving relay 65 therefore causes an operating impulse to be transmitted to the step magnet 70 of the rotary switch 71 from bus wire 76, through wire 77, make before break contacts 78, wires 79 and 80 through step magnets 70 and to ground. The contact arm 81 is thus moved from its zero position to its first contact within one fifth of a second after the leading contestant enters the track between the wayside devices 11 and 12 at the beginning of the race. Thereafter the arm 81 is moved a step every fifth of a second until it is stopped by the energization of the stop relay 68.

At every fifth step an impulse is transmitted to the impulse receiving relay 651 of switch 711, by the circuit from bus wire 76, arm 81, contact 5, and wire 83 to receiving relay 651 and to ground. The step magnet 701 is then operated by the circuit: bus wire 76, wire 771, contacts 781, wire 791, and 801 through step magnet 701 to ground. Similarly every tenth contact on the seconds switch 711 is connected to the receiving relay 652 of the ten seconds switch 712 and the same is operated to indicate the lapse of tens of seconds. Thus it will be understood that where needed, and particularly in the timers that time longer distances other switches may be added to indicate minutes and tens of minutes.

It will now be understood that as soon as the race starts or more accurately, as soon as the leader of the race passes between the first set of signaling devices 11 and 12, or a least within less than a fifth of a second thereafter, all of the timers are set in operation, the same being made to operate in response to the impulses transmitted to them by the interrupter. As the timers are being operated by the impulse generator and independently of the progress of the race, the contestants in the course of their travel on the track pass successively between the wayside apparatus 11 and 12 every sixteenth of a mile. Everytime this happens, or rather as soon as the leader of the race reaches the wayside apparatus so that a portion of the leader's body is interposed between the source of light 13 and the photoelectric cell 17 a signal is transmitted along the track wire 19 to the track signal receiving relay 41 and the master rotary step switch 47 is moved one step. These operations of the master rotary step switch 47 serve to control the stopping of the timers. Thus the quarter mile timer is stopped as soon as the leader in the race has reached the quarter mile point in the race. For this purpose, the fifth contact on the master rotary switch is connected to the stop relay 68 by wire G, whereas the ninth contact on the same master rotary switch is connected to a corresponding stop relay 681 in the half mile timer by wire H, the thirteenth contact being connected with a corresponding stop relay 682 in the three-quarter mile timer by wire I, and so on.

Thus at the quarter-mile mark the stop relay 68 will receive an impulse from source B, through armature 48, contact 55, wire 56, arm 52 and wire G to ground. A self-locking circuit from source 84, through manual switch 85, contact 86 and armature 87 maintains the stop relay energized. This keeps the contact 67 open, thus disconnecting the quarter-mile timer from the interrupter 62. The remaining timers are stopped by an analogous series of operations when the controller switch has reached the corresponding point.

At race tracks it is common practice to vary the start of the race, depending upon the length of the race so that the finish of the race should take place at the same point on the track; namely, in front of the judge's stand, and in full view of the occupants of the grand stand. In the operation of the system as thus far described, the quarter-mile, half mile, three-quarter mile, and mile timers will cease operating as soon as the race has run that distance. By reason of the fact that races vary in length, the present system provides means whereby the stopping of the finish timer is pre-set manually in accordance with the length of the race. For this purpose an auxiliary race selector rotary switch 90 is provided which may be of the same construction as the master rotary switch and may have the same number of contacts, twenty-five or fifty, as desired. The contacts on the switch 90 are connected as shown by wires 91 to the stop control wires G, H, I, and J. The auxiliary rotary switch 90 is so disposed that its arm 92 may be moved to a position that corresponds to the length of the race. Thus, if it is a one-mile race, then the arm 92 is moved to the position where it connects with wire J. The switch 90 may be so constructed that the arm 92 may be moved manually or as shown herein, the manually operable switch 94 may be inserted in the circuit of its operating electromagnet 93. By the repeated manipulation of the manual switch 94, the arm 92 will be moved a step at a time until it reaches the desired position.

The arm 92 of the auxiliary rotary switch 90 remains in its set position and contrary to the operation of the other rotary switches in the present system it is not responsive to any signals. It will now be seen that when the rotary arm 52 of the switch 47 sends a stop impulse on one of the wires G, H, I, or J, and the arm 92 is connected to the wire carrying the stop impulse, then the same impulse will be transmitted through the arm 92 and wire F to the stop relay 95 and stop the operation of the finish timer.

The system as thus far described is designed to operate where the length of the race is in multiples of a quarter of a mile. In some races, however, odd yardage is employed. For this purpose, one or more additional photoelectric cell units 100 are placed along the track corresponding to the odd yardage starting points. The photoelectric cell unit which is illustrated at 100 is illustrated to schematically show all of the elements that go into the devices 11 and 12. Each of these photoelectric cell units 100 is connected to its own track control relay 101 through devices identical with those shown and described earlier and here schematically shown at 102; the relay 101 here corresponding to relay 18. The switch 103 like the manual switch 42 is employed in order to prevent false starts from starting the timers. For this reason, the operator is stationed at one or the other of these manual switches 103 or 42 and keeps them open until the race is to start at which time he closes the switch and permits it to remain closed. Normally, that is, when the apparatus 11, 12 is used to start the race, the movable contact arm 114 is in engagement with the contact 115. The finish timer, which is schematically indicated by stop relay 95, therefore receives its operating impulses through the contact 61 of the starting relay 58 and then through wire 99, contact 115, arm 114, and impulse wire E4. When the race is an odd yardage race the contact arm 114 is moved away from contact 115 and into engagement with one of the contacts 110, each of which have associated with them the photoelectric cell and the remaining apparatus to permit the transmission of impulses to wire E4 from the interrupter 62.

Energization of the track control relay 101 by an impulse from the wayside apparatus 100 and 102 operates its armature 105 to pick up an impulse from the make before break contacts 106 and 107 and transmits the same to the starting relay 108. The starting relay 108 is provided with self-locking contacts 109 in the same manner as the starting relay 58. The energization of the starting relay 108 serves to connect contact 110 to the interrupter 62 by closing the contacts 111 and the interrupter transmits its impulses through arm 114 to wire E4 and to finish timer.

After the moving object passes its full sixty yards, or whatever the odd yardage may be, it will then break the beam on the first unit for the full mile and as fully set forth hereinabove will set into operation the rotary switch 71 and the quarter mile, half mile, three-quarter mile, and one mile timers. Thus, when the race is finished, the finish timer will indicate the time consumed by the full length of the race, whereas the remaining timers will indicate the time over the usual mile.

Whenever the operation of a timer has stopped, the switch arms of the rotary switches 71, 711, 712, etc., occupy positions which correspond to and can be relied upon to indicate the time of that portion of the race. It is desirable, however, that the time be displayed in such a manner that it becomes legible to all the spectators at the race.

For this purpose each rotary switch in each timer is provided with illuminated signals indicated at 120 in connection with the first switch of the quarter mile timer. Each signal 120 is controlled by an indicator relay 121. The first relay 121 is connected to the first, sixth, eleventh, etc., contacts. Similarly, the second relay is connected to the second, seventh, twelfth, etc., contacts. When the stop relay 68 of the timer has been energized and the timer has ceased operating, the self-locking contact 86 also serves to energize the light control relay 123 by the following circuit: source 84, switch 85, 86, wire 124, light control relay 123 to ground. The energization of the light control relay 123 closes contacts 125, thereby applying ground to the light operating relays 121. It will thus be seen that depending upon the position of the arm 81 one of the indicator relays 121 will be energized when the timer has ceased operating and its corresponding light control switch 126 will close, thereby closing the circuit for the signal light, and giving an indication of the position of the arm 81 and indicating the time in fifths of a second. Similarly, the rotary switch 711 is provided with a similar series of ten relays corresponding to relays 121. Rotary switch 712 will have six light operating relays 21.

It will now be understood that at the finish of the race, the spectators will have before them the time for the whole race, as well as the time for the mile, three-quarter, half, and quarter mile.

After the system has performed its function of measuring and indicating the time of a race, the system is reset to normal, and the switches are reset to zero position so that they are ready for the next race. To this end the switch 59 is temporarily opened, thus deenergizing starting relay 58. Switch 85 is then temporarily opened thus deenergizing the stop relay and signal control relay 123. The rotary switches are now reset to zero by temporarily closing switch 129. For this purpose each rotary switch carries a second contact arm keyed to the same shaft to which the operating arms previously discussed are keyed, as indicated by 160, the two arms being insulated from each other. The reset arm is designated 811 as carried by the switch 71 and rotatable as a unit with the arm 81. The duplicate homing bank of contacts 812 over which the arm 811 travels is short circuited as shown and connected to contact 127 of normally deenergized reset relay 72. All rotary switches are provided with such reset relays and are all connected together by reset bus wire M, which is connected to source 128 through normally open manual switch 129. When it is desired to reset all rotary switches to zero, switch 129 is closed and the reset relays become energized thereby supplying current from source 75 through contact 127 to contacts 812 and arm 811 and to the step magnet 70 through wire 131, normally closed contact 130, and wires 132 and 80. The step magnet then acts as a self-interrupter by opening its contacts 130 by the movement of its armature 133, with the result that the arm 81 and 811 will be stepped around until they are brought to the zero position at which point the absence of an energized contact in the bank 812 causes the operation to cease. The switch 129 is then opened. All rotary switches are thus reset to zero by the temporary closing of the switch 129 the switch being kept closed until all rotary switches have reached the zero position. The system is now ready for the next race.

Parts of the system may if desired be used independently. Thus Fig. 2 shows a timer being arranged with the rotary interrupter and by the interposition of the switch 150 the timer is employed as a stop watch, giving a public indication of the time of the race. In this system the timer is indicated by the box 151. When it is desired to time a race without the use of the wayside apparatus the switch 150 is moved at the start of the race from the full line position to the dotted line position thus causing the impulses generated by the rotary interrupter to pass through arm 152 and through wire 153 and enter the timer to operate it as has previously been described. At the end of the race, the switch is moved to the full line position so that the stop relay is energized.

I claim:

1. In a race track and a race timing system therefor; the combination of wayside devices disposed at intervals along the track and operable by the passage of a constant to transmit an electric controlling impulse, a finish timer operable to start and stop with the race to indicate the time of the full length of the race, other timers operable to indicate the time over portions of the track, means operatively interposed between said devices and said timers to control the starting and stopping of said timers said means comprising a master rotary step switch operable in response to said controlling impulses and controlling the starting and stopping of said other timers, auxiliary wayside apparatus selectively controlling the starting of the finish timer, an auxiliary rotary step switch electrically interconnected with said master switch and which may be preset to determine the stopping of the finish timer, and suitable circuits for said system.

2. A system for timing the travel of a moving object over a course comprising a plurality of wayside devices disposed along the course at predetermined intervals, a wire disposed along the wayside, means operable by the passage of the moving object past each of said wayside devices to transmit an electric controlling impulse along said wire; a central station, a receiving relay at the central station operable by said impulses, a master rotary step switch at said central station operable by the operation of said receiving relay; a periodic impulse generator; a plurality of timers each comprising a series of rotary switches operable by said impulse generator; a starting relay operable by the movement of the master switch from its off position operatively to connect all of said timers to said impulse generator, means individual to each timer operable in response to a predetermined position of said master switch to disconnect each timer from said generator, and suitable circuits for said system.

3. In a timing system for race tracks, a wayside apparatus comprising a device for generating light oscillations, a photoelectric cell disposed to receive the oscillations and to generate an oscillating electric current in response thereto, an amplifier, a relay normally energized by said current, means including a second relay operable to energized condition by the deenergization of the first relay, a locking circuit for the second relay, means including an impulse transmitting relay operable by the energization of said second relay to transmit an electric impulse, whereby the entry of the first contestant between the light source and the photoelectric cell will cause the transmission of an impulse and render said wayside apparatus unresponsive to the passage of the remaining contestants therebetween, and suitable circuit means and current supply for the system.

4. A timing system for race tracks comprising a track wire; a plurality of wayside apparatus disposed at intervals along the track and each apparatus comprising a source of light disposed on one side of the track, a photoelectric cell disposed on the other side of the track to receive the light and to generate an electric current in response thereto, a relay system associated therewith to transmit an electric control impulse to the track wire in response to an interception of said light; a control impulse receiving relay connected to the wire, a master rotary step switch movable in response to said impulses; a plurality of timers each comprising a periodic impulse receiving relay, a stop relay, a series of rotary step switches and indicators operable in accordance with the position of said rotary switches; a periodic impulse generator for operating said timers, a starting relay operable in response to the movement of said master switch from off position to connect said receiving relays in said timers to said generator, and a connection between each of said stop relays and a different predetermined contact on said master switch, thereby determining the point in the race at which the corresponding timer will stop.

5. A timing system for race tracks comprising a track wire; a plurality of wayside apparatus disposed at intervals along the track and each apparatus comprising a device for generating a light beam disposed on one side of the track, a photoelectric cell disposed on the other side of the track to receive the beam and to generate an oscillating electric current in response thereto, a relay system associated therewith to transmit an electric control impulse to the track wire in response only to the first interception of said beam; a control impulse receiving relay connected to the wire, a master rotary step switch movable by said control impulse; a plurality of timers each comprising a periodic impulse receiving relay, a stop relay, a series of rotary step switches, indicators operable in accordance with the position of said rotary switches, and a relay operable upon the energization of the stop relay to render the indicators operative; a periodic impulse generator for operating said timers, a starting relay operable in response to the movement of said master switch from off position to connect said receiving relays in said timers to said generator, and a connection between each of said stop relays and a different predetermined contact on said master switch, thereby determining the point in the race at which the corresponding timer will stop.

6. A timing system for race tracks comprising a track wire; a plurality of wayside apparatus disposed at intervals along the track and each apparatus comprising a device for generating a variable light beam disposed on one side of the track, a photoelectric cell disposed on the other side of the track to receive the beam and to generate an oscillating electric current in response thereto, a relay system associated therewith to transmit an electric control impulse to the track wire in response to an interception of said beam; a control impulse receiving relay connected to the wire, a master rotary step switch movable in response to said impulses; a finish timer and a plurality of other timers each comprising a periodic impulse receiving relay, a stop relay, a series of rotary step switches, indicators operable in accordance with the position of said rotary switches; a relay operable upon the energization of the stop relay to render the indicators operative; a periodic impulse generator for operating said timers, a starting relay operable in response to the movement of said master switch from off position to connect the receiving relays in said other timers to said generator, and a connection between the stop relays of said other timers and a predetermined contact on said master switch; and auxiliary devices operable to preset the starting and stopping of said finish timer for each race.

7. A system for timing the travel of a moving object over a course comprising a plurality of wayside devices disposed along the course at predetermined intervals, a wire disposed along the wayside, means operable by the passage of the moving object past each of said wayside devices to transmit an electric control impulse along said wire and to render the said wayside device inoperative; a central station, a receiving relay at the central station operable by said impulses, a master rotary switch at said central station operable by the operation of said receiving relay; a periodic impulse generator; a plurality of timers each comprising a series of rotary switches operable by said impulse generator; a starting relay operable by the movement of the master switch from its normal position operatively to connect all of said timers to said impulse generator and means individual to each timer operable in response to a predetermined position of said master switch to disconnect each timer from said generator; and means at the central station operable at will to render said wayside devices operative.

8. A system for timing the travel of a moving object over a course comprising a plurality of wayside devices disposed along the course at predetermined intervals, a wire disposed along the wayside, means operable by the passage of the moving object past each of said wayside devices to transmit an electric control impulse along said wire; a central station, a receiving relay at the central station operable by said impulses, a master rotary switch at said central station operable by the operation of said receiving relay; a periodic impulse generator; a plurality of timers each comprising a series of rotary switches operable by said impulse generator; a starting relay operable by the movement of the master switch from its normal position operatively to connect all of said timers to said impulse generator and means individual to each timer operable in response to a predetermined position of said master switch to disconnect each timer from said generator; and means at the central station operable at will to reset the system to normal.

9. A timing system for a race track, where races may start at any one of several points along the track and having only one finish point, comprising a periodic impulse generator, a rotary timer, a relay operable to connect said generator to said timer to start and operate said timer by the impulses of said generator, a plurality of wayside apparatus disposed at intervals along the track, each wayside apparatus being operable by the passage of a contestant to energize said relay to connect the said generator to the said timer, a holding circuit for said relay, another wayside apparatus at the finish point operable by the passage of a race contestant to transmit a control impulse, and a stop relay associated with said timer operable in response to said control impulse to disconnect said timer from said impulse generator to stop the timer.

10. A timing system for a race track, where races may start at any one of several points along the track and finish at only one point, comprising a wayside apparatus disposed at intervals along the track and at the finish point, a track wire, said wayside apparatus being operable by the passage of a race contestant to transmit an electric control impulse to said track wire, an impulse generator, a rotary timer operable by the impulses of said impulse generator, a relay operable in response to the first of said control impulses transmitted by said track wire to connect said impulse generator to said timer, a self-locking circuit for said relay, and a stop relay for disconnecting said generator from said timer operable in response to the passage of the winning contestant past the wayside apparatus at the finish point.

11. A timing system for a race track, where races may start at any one of several points along the track and finish at only one point, comprising a plurality of wayside apparatus disposed along the track at predetermined intervals, and operable by the passage of a moving object to transmit an electric control impulse; a plurality of rotary timers for indicating the time for predetermined portions of the race and a finish timer for indicating the time of the race, a periodic impulse generator for operating said timers, means operable by the first of said control impulses to connect said generator to all of said timers, means movable in response to the succession of control impulses transmitted by said wayside apparatus, said movable means serving to disconnect each timer as the leading contestant passes the corresponding point on the track and a manually operable switch which is preset for the length of the race and which serves to disconnect the finish timer from the impulse generator at the end of the race.

HARRY D. BELOCK.